No. 654,481. Patented July 24, 1900.
H. NADORFF.
TAPPING DEVICE.
(Application filed Nov. 22, 1899.)
(No Model.)
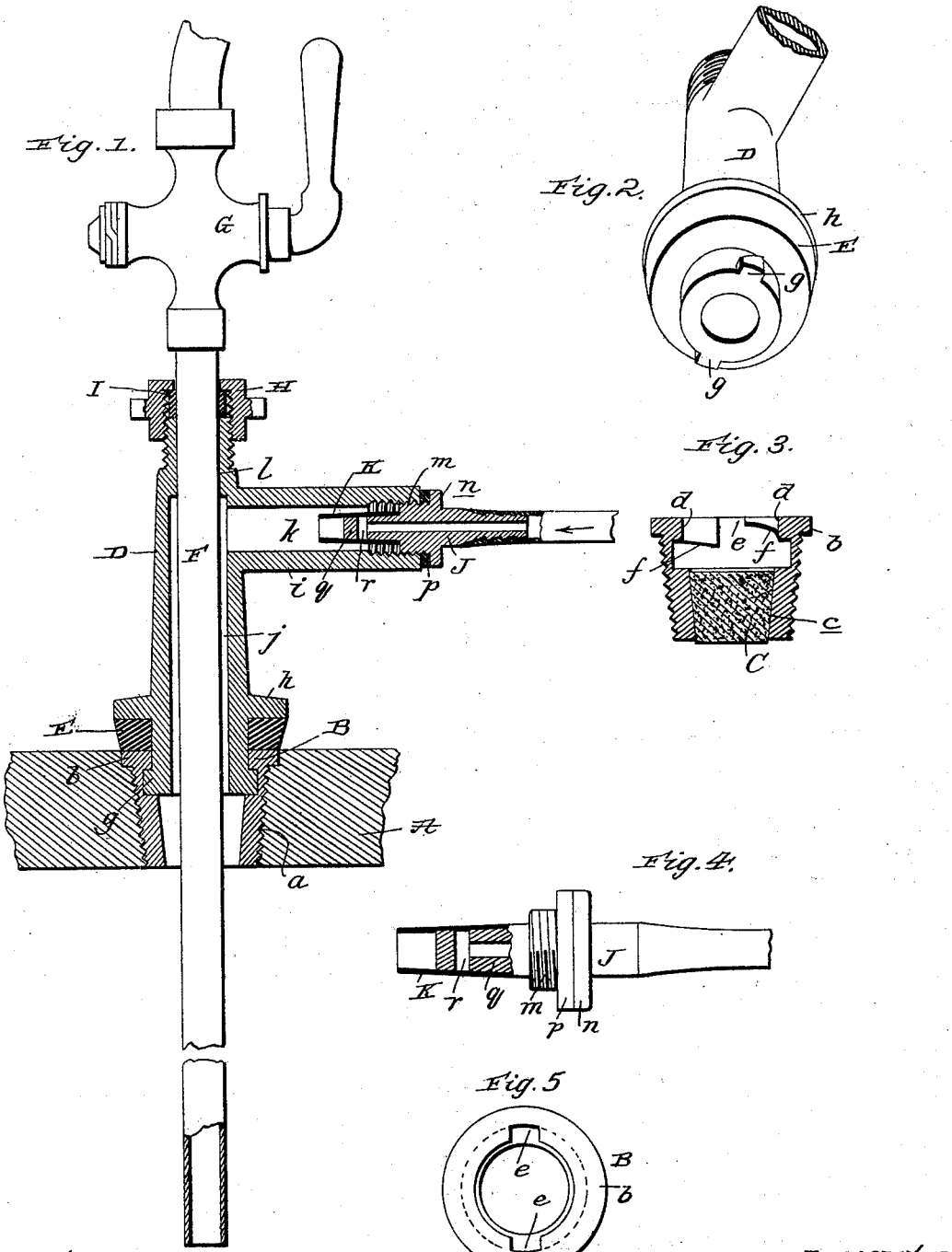
Witnesses:
Inventor
Henry Nadorff
By James J. Sheehy
Attorney

UNITED STATES PATENT OFFICE.

HENRY NADORFF, OF LOUISVILLE, KENTUCKY.

TAPPING DEVICE.

SPECIFICATION forming part of Letters Patent No. 654,481, dated July 24, 1900.

Application filed November 22, 1899. Serial No. 737,905. (No model.)

*To all whom it may concern:*

Be it known that I, HENRY NADORFF, a citizen of the United States, residing at Louisville, in the county of Jefferson and State of Kentucky, have invented new and useful Improvements in Tapping Devices, of which the following is a specification.

My invention relates to tapping devices, and contemplates the provision of a device through the medium of which a barrel of beer or other beverage may be expeditiously tapped and supplied with air or gas without loss and one which, as compared with devices at present in use, is extremely simple, compact, inexpensive, and durable and is susceptible of being readily repaired when necessary.

With the foregoing in mind the invention will be fully understood from the following description and claims when taken in conjunction with the annexed drawings, in which—

Figure 1 is a sectional view illustrating my improved device in its proper operative position with reference to the head of a barrel. Fig. 2 is a broken perspective view of the sleeve-section of the device. Fig. 3 is a diametrical section illustrating the bushing which forms part of my improved device and the bung therein. Fig. 4 is a view, partly in section and partly in elevation, illustrating the peculiar and advantageous air-nipple and non-return valve. Fig. 5 is a face view of the bushing.

Referring by letter to the said drawings, A is the head of a beer or other barrel, which is provided with the usual bung-hole $a$, and B is a bushing forming part of my improved device. This bushing is exteriorly tapered and threaded to permit of it being screwed into the bung-hole and fixed in position and is preferably provided at its outer end with an exterior flange $b$, designed to serve as a stop and limit its inward movement. It is also provided with an inwardly-tapered bore $c$, designed to receive a correspondingly-tapered bung C, of cork or other suitable material, and at its outer end has an inwardly-directed flange $d$. The said flange $d$ is provided in its inner edge and at diametrically-opposite points with grooves $e$ and is also provided at its inner side with two oppositely-disposed inclined planes $f$, each of which has its beginning at one of the grooves $e$, as shown.

D is the sleeve-section of the device. This sleeve-section is provided at its inner end with two diametrically-opposite lugs $g$ and is also provided adjacent to its inner end with an exterior flange $h$. The lugs $h$ are of a size to pass through the grooves $e$ of bushing B and are beveled, as shown, whereby it will be seen that when the sleeve-section is placed in the position shown in Fig. 1 and given a partial turn it will be drawn inwardly with respect to the barrel. When this is done, a gasket E, of rubber or other suitable material, arranged at the inner side of the flange $h$, will be pressed against the face of the bushing B and an air-tight connection between the sleeve-section and said bushing will be effected. It will also be seen that when the rubber gasket is compressed, as stated, it will, by tending to expand, hold the lugs $g$ securely against the inclined planes $f$, and thereby effectually prevent casual disconnection of the sleeve-section from the bushing.

In addition to the lugs $g$ and flange $h$ the sleeve-section D is provided with a lateral arm $i$, interiorly threaded at its outer end. Said sleeve-section is also provided with a chamber $j$ in communication with a chamber $k$ in arm $i$ and at its outer end has a bore $l$, comparatively small in diameter. This bore $l$ is designed to snugly receive an endwise-movable draft-tube F, which is equipped at its outer end with the usual cock G.

An air-tight connection is effected between the tube F and sleeve-section D through the medium of a gland H, screwed on the outer end of the latter, and a packing-ring I, contained in said gland.

J is the air-nipple of the device, which is designed for the connection of the usual air or gas supply tube. This nipple is threaded at $m$ to engage the interior threads of the arm $i$ and is provided with the usual flange $n$, between which and the end of the arm $i$ a gasket $p$ is interposed, as shown. Said nipple is also provided with an inner reduced portion $q$, which is tapered toward its end, as shown, and is provided with a diametrical port $r$ in communication with the bore of the nipple.

K is a sleeve of rubber which snugly surrounds the end portion $q$ of the nipple and extends beyond the same, as best shown in Fig. 4.

When air is forced in the direction of the arrow in Fig. 1, it will pass from the bore of the nipple J through port $r$ and pressing the rubber sleeve away from the portion $q$ of the nipple will pass into the chamber $k$ of the sleeve-section and from thence through the chamber $j$ and bushing B into the barrel. Such air is, however, effectually prevented from reëntering the nipple and passing out of the barrel by virtue of the fact that the pressure in the chamber $k$ presses and holds the sleeve K against the portion $q$ of the nipple.

It will be appreciated from the foregoing that the sleeve K forms a highly-efficient non-return valve and is not liable to be connected to and secured in a closed position on the nipple portion $q$ by the adhesive ingredients in the beer. This latter is due in large measure to the taper of the nipple portion and the extension of the sleeve beyond the end of the nipple portion, which extension is held open by the nipple portion and is occupied by the air or gas present in chamber $k$, which tends to prevent the sleeve being set by the adhesive in the beer against the nipple portion and is assisted in such action by the taper of the nipple portion. The taper of the nipple portion and the extension of the sleeve beyond the end of the nipple portion are also advantageous, since they permit of the sleeve being readily drawn off the nipple portion when it is desired to replace said sleeve with a new sleeve.

In using my improved device to tap a barrel of beer and supply the same with air or gas the sleeve-section D is connected to the bung-bushing B in the manner before described, and the nipple J is connected with a source of air or gas supply. The tube F is now moved down until its inner end bears against the bung C and is struck by a mallet and driven inwardly until the bung C is forced out of the bushing and into the barrel. This operation is of course carried out while the cock G is closed; but after the tap is effected and the beer-pipe connected to the cock G said cock is opened.

It will be seen from the foregoing that my improved device is so constructed that the beer or other liquid is effectually prevented from deteriorating any of its parts; also, that the rubber sleeve K, which is the only weak element of the device, may be readily pulled off the nipple portion $q$ when impaired and a new sleeve may be as readily placed on said nipple portion.

Having thus described my invention, what I claim is—

1. In a tapping device, the combination of a sleeve-section having a lateral arm, a removable nipple screwed into the end of said arm and having the inner reduced and tapered portion $q$ provided with a diametrical port communicating with its bore, and the removable sleeve K of rubber arranged on said reduced or tapered portion $q$ of the nipple and extending beyond the inner end thereof, as and for the purpose set forth.

2. In the tapping device described, the combination of the bushing fixed in the bung-hole of a barrel and having the taper bore $c$ in its inner portion adapted to hold a bung of cork or other suitable material, and also having the inwardly-directed flange at its outer end, provided in its inner edge with opposite grooves, and also provided at its inner side with oppositely-disposed inclined planes, the sleeve-section having lugs at its inner end adapted to pass through the grooves and engage the inclined planes of the bushing-flange, and also having the integral exterior flange $h$ adjacent to its inner end, the exterior threads at its outer end, the bore $l$ in said outer end, the chamber $j$ and the arm $i$ communicating with said chamber, a removable nipple screwed into the end of said arm $i$ and having the inner reduced and tapered portion $q$ provided with a diametrical port communicating with its bore, the removable sleeve K of rubber arranged on said reduced or tapered portion $q$ of the nipple and extending beyond the inner end thereof, the gasket surrounding the sleeve-section below the flange $h$ thereof, the gland mounted on the outer threaded end of the sleeve-section and containing packing and the endwise-movable draft-tube extending through the sleeve-section and the gland thereon, substantially as and for the purpose set forth.

In testimony whereof I have hereunto set my hand in presence of two subscribing witnesses.

HENRY NADORFF.

Witnesses:
 ED. BYRNE,
 ED. STEINBOCK.